United States Patent
Vila Bonas

(10) Patent No.: US 8,398,467 B2
(45) Date of Patent: Mar. 19, 2013

(54) MOTORIZED DEVICE FOR MAKING SAUSAGES

(75) Inventor: Juan Vila Bonas, Granollers (ES)

(73) Assignees: Juan Vila Bonas, Granollers (Barcelona) (ES); Jaime Ramon Vila, Granollers (Barcelona) (ES)

(*) Notice: Subject to any disclaimer, the term of this patent is extended or adjusted under 35 U.S.C. 154(b) by 467 days.

(21) Appl. No.: 12/797,675

(22) Filed: Jun. 10, 2010

(65) Prior Publication Data
US 2010/0317269 A1    Dec. 16, 2010

(30) Foreign Application Priority Data
Jun. 12, 2009   (ES) ................. 200900984 U

(51) Int. Cl.
*A22C 11/00*   (2006.01)

(52) U.S. Cl. ............................................. 452/42

(58) Field of Classification Search .......... 452/21–26, 452/30–32, 35–37, 42, 46–48, 51
See application file for complete search history.

(56) References Cited

U.S. PATENT DOCUMENTS

| | | | | |
|---|---|---|---|---|
| 5,131,883 A | * | 7/1992 | Hendriks et al. | 452/21 |
| 6,869,352 B2 | * | 3/2005 | Shefet et al. | 452/183 |
| 6,932,688 B2 | * | 8/2005 | Stanley et al. | 452/48 |
| 7,455,577 B2 | * | 11/2008 | Topfer | 452/30 |
| 7,575,506 B2 | * | 8/2009 | Ebert et al. | 452/35 |

* cited by examiner

*Primary Examiner* — Richard Price, Jr.
(74) *Attorney, Agent, or Firm* — MIchael J. Striker

(57) ABSTRACT

A motorized device for making sausages including a meat product situated inside a casing, the device has a first cutting element cutting a meat product; a second element carrying out an insertion of a product portion inside the casing and immediate twisting; and a single geared motor actuating both the elements.

10 Claims, 3 Drawing Sheets

MOTORIZED DEVICE FOR MAKING SAUSAGES

CROSS-REFERENCE TO RELATED APPLICATION

The invention described and claimed hereinbelow is also described in Spanish Utility Model No. 200900984 filed on Jun. 12, 2009. This Spanish Utility Model, whose subject matter is incorporated here by reference, provides the basis for a claim of priority of invention under 35 U.S.C. 119(a)-(d).

BACKGROUND OF THE INVENTION

The present invention relates to a motorized device, intended to carry out the final stages in the making of sausages which are presented in identical portions, by twisting the casing in whose interior the meat product has been inserted, previously prepared in the corresponding sausage making machine.

Most sausages are presented to the public for their purchase and consumption in strings of cut units, variable in quantity, all of them of identical weight and size, produced from a cylindrical and continuous sausage constituted by the meat product, suitably prepared, as the basic element which will be situated inside a continuous casing, made of intestine or a synthetic product suitable for its use in food, all of this prepared with the assistance of sausage making machines, wherefrom this continuous sausage emerges.

Once the shaping of the various single portions has been carried out, all of them continuous, of identical weight and size, the final operation begins, the "twisting" of the intestinal casing to delimit and isolate these single portions. This operation, until now, has been carried out manually and by hand.

SUMMARY OF THE INVENTION

Accordingly, it is an object of the present invention to provide a motorized cutting and twisting device which is an improvement of the existing devices.

In keeping with these objects and with others which shall become apparent hereinafter, one feature of the present invention, resides, briefly stated, in a motorized device for making sausages including a meat product situated inside a casing, the device has a first cutting element cutting a meat product; a second element carrying out an insertion of a product portion inside the casing and immediate twisting; and a single geared motor actuating both the elements.

The device in accordance with the present invention is situated directly at the outlet of the sausage machine and permits, in the first place, the definition of the portions of meat material to be carried out due to the programmed displacement of a piston mechanism in the cutter and, in the second place, the placement of this product portion inside the intestinal casing or the like, situated in the funnel of the twister mechanism and the "twisting" of said casing with the product therein, by means of turns of the cap of the twister device, thus producing the consequent separation between portions, the number of turns being pre-established, which come about due to the action of a set of gears, actuated by the geared motor of the device.

During the production process, when the cutting operation of the product occurs, the geared motor which actuates this device causes the ½-turn rotation of the cutting piston, leaving it ready for its displacement in the opposite direction and carrying out a subsequent and immediate work cycle. At the same time it also automatically causes the rotation of the turn cap of the twister mechanism, whereto the final funnel is coupled, and the rotation is caused by the action of an array of gears disposed for this purpose and actuated by the geared motor.

The combination of the gear cogs, together with the established programming in the electronic block of the device, will permit the determination and establishment of the rotations that will be made by the turn cap of the twister mechanism in order to twist the intestinal casing with the product already inside it.

The piston of the cutter is displaceable for providing a pre-set volume "portion" of the meat product which subsequently will be inserted into the casing, proceeding to the final "twisting" thereof, so that portions of the same volume and weight will always be produced, as established previously.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
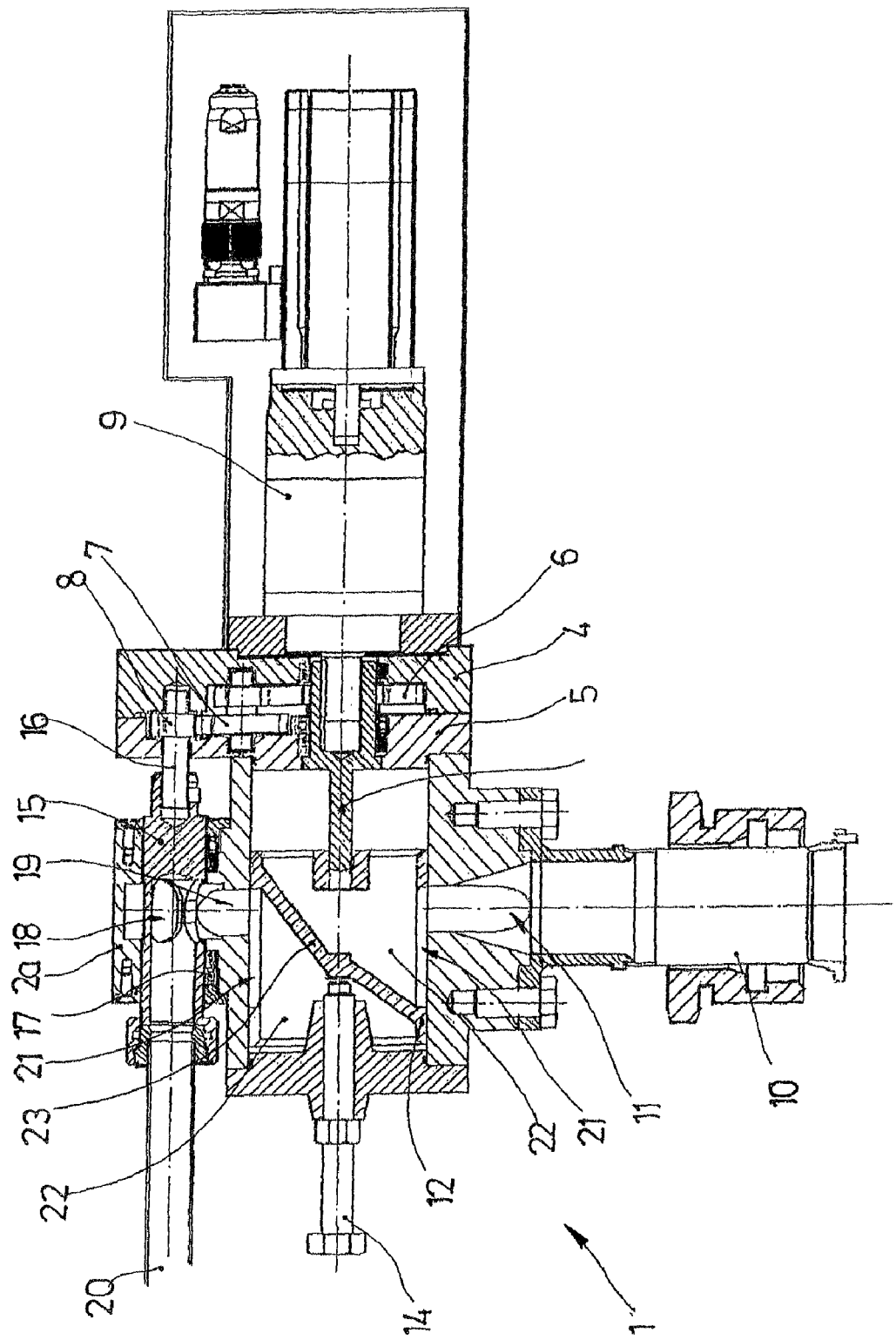
FIG. 1 is a cross-sectioned view of the motorized device for making sausages of the invention, according to the AA cross-section referenced in FIG. 2.
Figure 2:
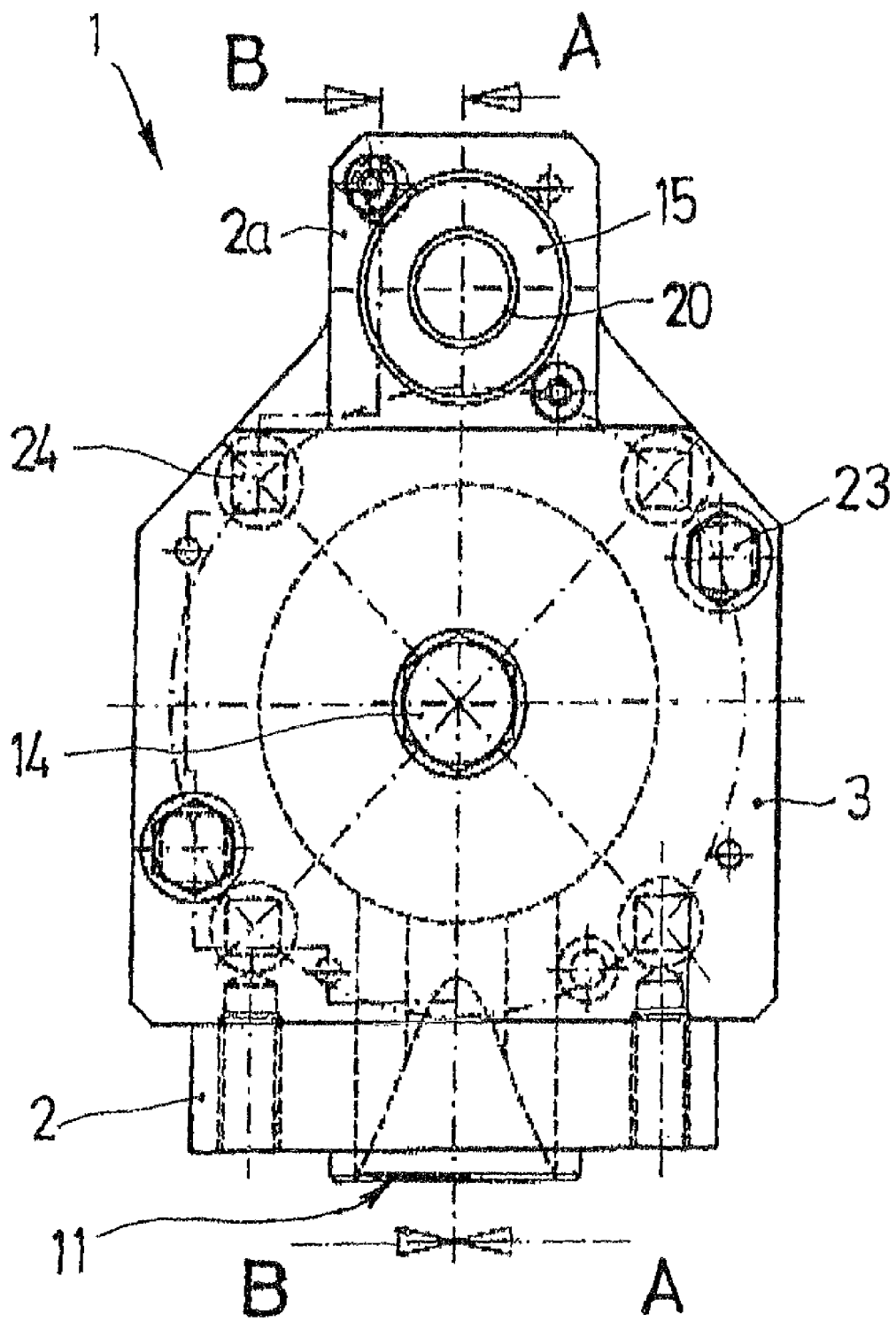
FIG. 2 is a frontal view of the motorized device for making sausages of the invention.
Figure 3:
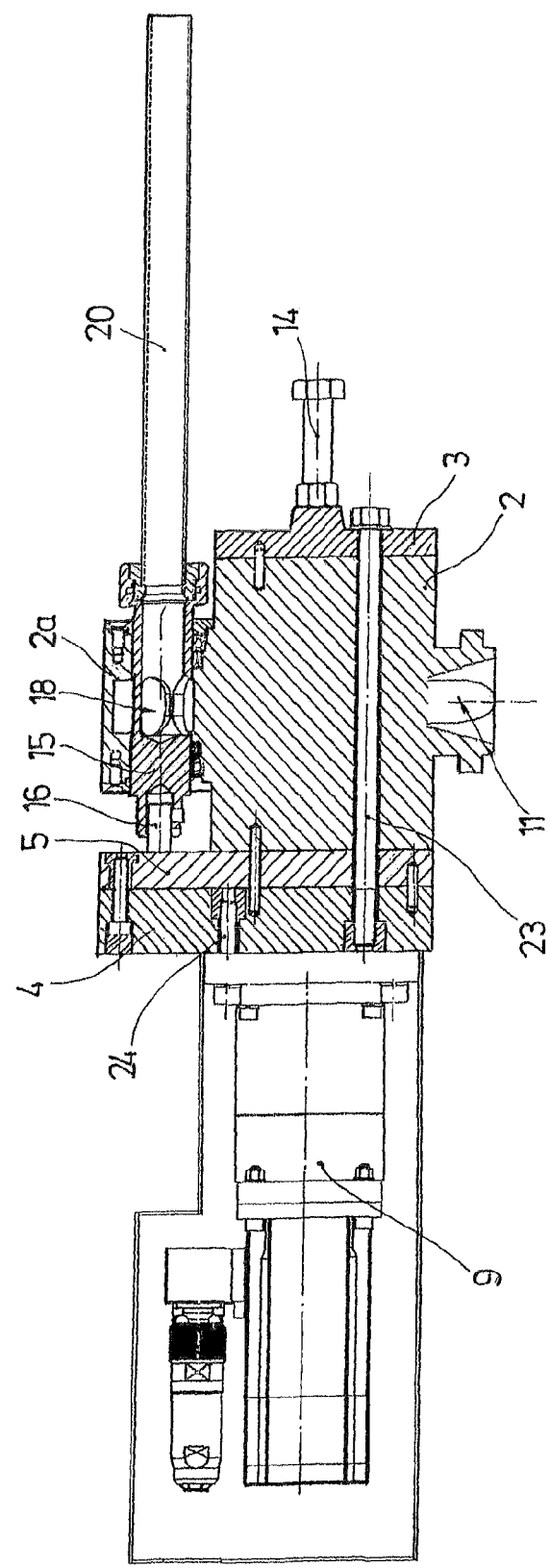
FIG. 3 is a cross-sectioned view of the motorized device for making sausages of the invention, according to the BB cross-section in FIG. 2.

The device (1) of the present invention, is constituted by an element wherein the formation of the meat product portions is carried out and a second element wherein the insertion of the meat product in the interior of the intestinal casing or other product suitable for the food industry is carried out, and the twisting thereof to shape and delimit the desired and previously established portion, of identical weight and sizes. This twisting is carried out by the twister element of the geared motor (9) of the device which is actuated either mechanically or by an order given by the operator.

The cutting element is formed by the body (2), closed by a frontal lid (3) and, behind, by a rear lid (4) and an intermediate lid (5), which delimit the space where lower (6), intermediate (7) and upper (8) gears are installed. The lower gear (6) is solidly joined to the outlet shaft of the geared motor (9).

The opening or inlet (10) whereto the sausage making machine is coupled is situated in the lower area of the side of the body (2), not represented in the drawings. This opening extends towards the inside of the body (2), adjustable from the outside through a tube (11).

A piston (12) is situated in the interior of the body (2) and can be moved axially on its axis (13) inside the body. Its displacement is delimited by a buffer (14), adjustable from the exterior by screwing The twisting element is formed by a turn cap (15), solidly joined to the upper gear (8) by means of its axle (16), and situated inside of the upper part (2a) of the body (2), fastened by rigid ball bearings (17), so that it permits its axial rotation along the axis of the cap (15), parallel to the horizontal axis of the body (2).

The gear (8), situated in the upper position inside the array of gears situated between the rear (4) and intermediate (5) lids of the body (2), is connected to the shaft of the geared motor (9) by means of the intermediate (7) and lower (6) gears. The lower gear (8) is solidly joined to the shaft of the geared motor (9), as described above.

When the geared motor (9) makes a half-turn, which is necessary for the piston (12) of the cutter to carry out its function, the rotation of the turn cap (15) is produced in a number of turns "n", determined by the speed ratio of the gears (6), (7) and (8), consequently causing the rotation, in unison, of a funnel (20), bearing the intestinal casing.

The turn cap (15), hollow inside, has inlets (18) corresponding to the outlet aperture (19) which connects the interior of the body (2) with the interior of its upper part (2a), so that the previously cut meat product will pass through the interior of the turn cap (15).

The twisting element is completed by the funnel (20), connected to the exterior end of the turn cap (15). The funnel (20) is the piece whereon the intestinal casing or similar product is placed, and wherefrom the sausage comes at the end of the production process, which will be treated manually, and suitably once it has exited.

The sausage machine, not represented in the drawings acts as a recipient for the meat product before cutting it. Upon carrying out the "stuffing" action, the passage of the product towards the cutter is caused through the connecting nozzle (10) and the tube (11).

This inlet tube (11) faces the lateral aperture (21) of the piston (12), which accesses one of the two equal interior spaces (22). The piston is divided interiorly, by a sloped wall (23). The other space, in turn, is accessible through the other identical lateral aperture (21).

In the representation of FIG. 1, the piston (12) is displaced and for this reason there is no connection between the inlet tube (11) and the outlet tube (19) because the sloped wall (23) of the piston (12) prevents it.

At this moment of the process, the operator will actuate a suitable mechanism, such as a pneumatic or an electric pedal, or a push button or it is done automatically, and the geared motor (9), cause a rotation of ½-turn, which will allow the upper space (22) of the piston (12) to be ready to receive the corresponding meat product.

When this ½-turn is made, the interior wall (23) of the piston (12) is inclined in the opposite direction to where it had been before the rotation. When the space (22) now considered as "lower space" receives the product coming from the sausage making machine through the inlet (10/11), it causes an axial displacement towards the rear area of the body (2), due to the action of the pressure of the received product. At the same time, in unison, the passage of the product contained in the other space (22) is produced towards the turn cap (15), through the outlet tube (19).

Various pins, screws and nuts provide the joining of the various components of the device.

Fastening rods (23) of the frontal (3) and rear (4) lids of the body (2) and fastening screws (24) of the geared motor (9) are utilized.

It will be understood that each of the elements described above, or two or more together, may also find a useful application in other types of constructions differing from the types described above.

While the invention has been illustrated and described as embodied in a motorized device for making sausages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motorized cutting and twisting device for making sausages including a meat product situated inside a casing, the device comprising a first cutting element cutting a meat product; a second element carrying out an insertion of a product portion inside the casing and immediate twisting; and a single geared motor actuating both said elements.

2. A motorized cutting and twisting device for making sausages as defined in claim 1, wherein said cutting element comprising a body delimiting a space in which lower, intermediate, and upper gears are located, said lower gear being solidly joined to an outer shaft of said geared motor, while said upper gear is solidly joined to a turn cap of a twisting mechanism.

3. A motorized cutting and twisting device for making sausages as defined in claim 2, wherein said body has a front lid, a rear lid, and an intermediate lid which delimit said space.

4. A motorized cutting and twisting device for making sausages as defined in claim 2, wherein said twisting element includes a turn cap located inside said body and fastened by rigid ball bearings for axial rotation around an axis extending parallel to a horizontal axis of said body, said turn cap being hollow and provided with inlet apertures for introducing the meat product coming from an interior of said body.

5. A motorized cutting and twisting device for making sausages as defined in claim 4, wherein said turn cap of said twisting element is solidly joined to said upper gear, so that when said geared motor is actuated to rotate one half turn, said turn cup rotates in a number of turns determined by a speed ratio of said gears.

6. A motorized cutting and twisting device for making sausages as defined in claim 5, further comprising a funnel bearing the casing and rotating in unison with said turn cap upon actuation of said geared motor, so as to carry a twisting of the casing.

7. A motorized cutting and twisting device for making sausages as defined in claim 2, wherein said body comprising a lower part provided with an inlet with an inlet tube leading to an interior of said body, said body also having an upper part provided with an outlet connecting the interior of said body with an upper appendage of said body.

8. A motorized cutting and twisting device for making sausages as defined in claim 7, further comprising a piston displaceable axially in the interior of said body and provided with two lateral apertures located diametrically opposite each other and providing access to two identical spaces delimited inside said piston by a sloped wall, so that said inlet tube faces one of said lateral apertures of said piston, so that after producing a stuffing the meat product passes until said space of said piston.

9. A motorized cutting and twisting device for making sausages as defined in claim 8, further comprising a buffer delimiting the displacement of said piston and adjustable from an exterior.

10. A motorized cutting and twisting device for making sausages as defined in claim 8, wherein upon producing a stuffing action a passage of the meat product to an interior of said piston facing said inlet is caused, and said geared motor is actuated causing a one-half turn rotation of said piston, so that an upper of said spaces displaces one two turn and becomes a lower space for receiving a product for a new cycle, and upon receiving a new amount of product due to its pressure said piston displaces axially toward a rear part of said body and the product contained in the other space passes toward said turn cap.

* * * * *